United States Patent
Zurbach et al.

(10) Patent No.: US 10,023,328 B2
(45) Date of Patent: Jul. 17, 2018

(54) ENGINE FOR A SPACECRAFT, AND SPACECRAFT COMPRISING SUCH AN ENGINE

(71) Applicant: SAFRAN AIRCRAFT ENGINES, Paris (FR)

(72) Inventors: Stéphan Joseph Zurbach, Vernon (FR); Frédéric Raphaël Jean Marchandise, Vernon (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/312,421

(22) PCT Filed: May 13, 2015

(86) PCT No.: PCT/FR2015/051258
§ 371 (c)(1),
(2) Date: Nov. 18, 2016

(87) PCT Pub. No.: WO2015/177438
PCT Pub. Date: Nov. 26, 2015

(65) Prior Publication Data
US 2017/0088293 A1 Mar. 30, 2017

(30) Foreign Application Priority Data
May 21, 2014 (FR) ..................... 14 54553

(51) Int. Cl.
*B64G 1/40* (2006.01)
*F03H 1/00* (2006.01)
(Continued)

(52) U.S. Cl.
CPC ............. *B64G 1/405* (2013.01); *F02K 9/62* (2013.01); *F02K 9/76* (2013.01); *F02K 9/97* (2013.01);
(Continued)

(58) Field of Classification Search
CPC ........ F03H 1/00; F03H 1/0006; F03H 1/0012; F03H 1/0018; F03H 1/0025;
(Continued)

(56) References Cited

U.S. PATENT DOCUMENTS

| 4,577,461 A * | 3/1986 | Cann ...................... B64G 1/406 219/121.49 |
| 2003/0046921 A1* | 3/2003 | Hruby ................... F03H 1/0012 60/202 |
| 2009/0139206 A1 | 6/2009 | Spanjers et al. |

FOREIGN PATENT DOCUMENTS

| FR | 2 986 213 A1 | 8/2013 |
| FR | 2 986 577 A1 | 8/2013 |

OTHER PUBLICATIONS

International Search Report in corresponding International Application No. PCT/FR2015/051258 dated Aug. 3, 2015 (5 pages—English Translation included).

* cited by examiner

*Primary Examiner* — William H Rodriguez
*Assistant Examiner* — William Breazeal
(74) *Attorney, Agent, or Firm* — Bookoff McAndrews, PLLC

(57) ABSTRACT

A space vehicle engine (10) comprising a chemical thruster having a nozzle (30) for ejecting combustion gas, together with a Hall effect thruster. The engine is arranged in such a manner that the nozzle serves as the ejection channel for particles ejected by the Hall effect thruster when it is in operation. The engine can deliver high thrust with low specific impulse or relatively low thrust with large specific impulse.

12 Claims, 2 Drawing Sheets

Figure 1:
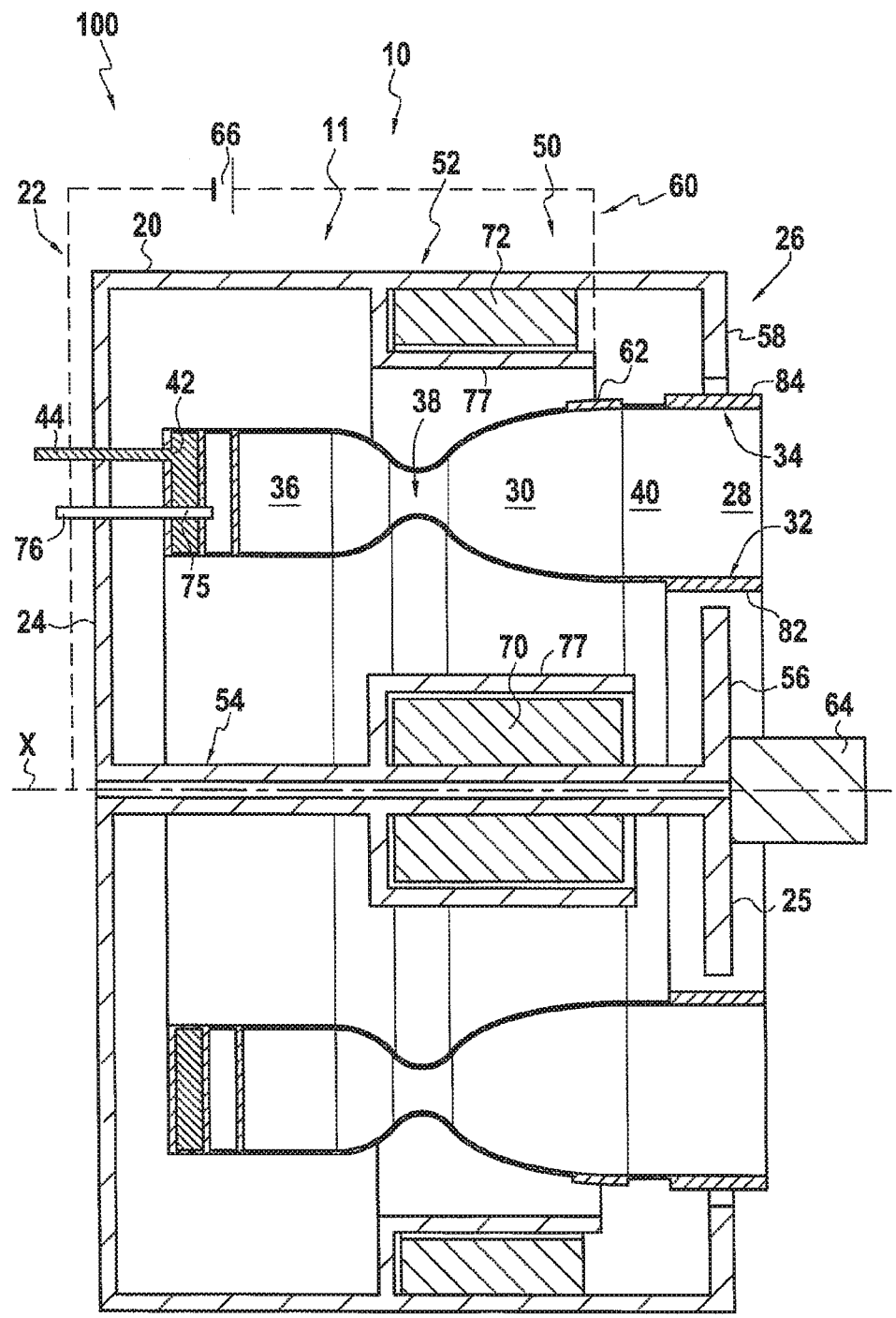

(51) Int. Cl.
*F02K 9/62* (2006.01)
*F02K 9/76* (2006.01)
*F02K 9/97* (2006.01)
*B64G 1/24* (2006.01)

(52) U.S. Cl.
CPC ..... *F03H 1/0075* (2013.01); *B64G 2001/245* (2013.01)

(58) Field of Classification Search
CPC .... F03H 1/0031; F03H 1/0037; F03H 1/0043; F03H 1/005; F03H 1/0056; F03H 1/0062; F03H 1/0068; F03H 1/0075; F03H 1/0081; F03H 1/0087; F03H 1/0093; B64G 1/405; B64G 2001/245; F02K 9/76; F02K 9/97; F02K 9/62
See application file for complete search history.

ENGINE FOR A SPACECRAFT, AND SPACECRAFT COMPRISING SUCH AN ENGINE

CROSS-REFERENCE TO RELATED APPLICATIONS

This application is the U.S. national phase entry under 35 U.S.C. § 371 of International Application No. PCT/FR2015/051258, filed on May 13, 2015, which claims priority to French Patent Application No. 1454553, filed on May 21, 2014.

The present invention relates to the field of engines for space vehicles, in particular for satellites.

In the context of certain applications, it may be desirable for a space vehicle to present two modes of operation, either at high thrust, or else at high specific impulse. Two examples may be mentioned:
 putting a satellite onto station and maintaining its orbit: putting a satellite of a station requires high thrust in order to transfer it into a geostationary orbit as quickly as possible; and the satellite requires propulsion with high specific impulse in order to maintain it in position during fifteen years;
 exploration: it could be advantageous to have a thruster enabling a celestial object to take off, and then once in space, enabling it to make use of propulsion at high specific impulse.

In known manner, satellite propulsion is generally obtained by means of two technologies: chemical propulsion and electric propulsion. These two modes of propulsion have respective specific domains of operation in a plot of specific impulse ($I_{sp}$) against thrust: in outline, chemical thrust enables high thrust to be achieved, but specific impulse remains limited to 450 seconds (s). Conversely, electric propulsion enables high specific impulses to be obtained (2000 s), but the thrust remains relatively low.

For satellite propulsion, Hall effect thrusters are thus used in attitude and orbit control systems (AOCS) for space vehicles and in particular in the AOCSes of geostationary satellites. Hall effect thrusters make it possible to obtain very high specific impulse ($I_{sp}$), of the order of 1500 s, thus making it possible to control accurately the attitude and/or the position of the vehicle while using mass and complexity that are considerably less than would be necessary in conventional systems using inertial devices, e.g. such as reaction wheels, in combination with chemical thrusters for desaturating them.

Nevertheless, a Hall effect thruster offering high specific impulse normally achieves only very low thrust. Consequently, AOCSes incorporating Hall effect thrusters are conventionally associated with chemical thrusters for certain fast maneuvers, such as orbit transfer or putting into position. Nevertheless, this presents the drawback of increasing the overall cost and complexity of the space vehicle, to the detriment of its reliability.

In conclusion, neither of the available technologies (chemical propulsion, electric propulsion) makes it possible to provide propulsion in both of these intended operating domains, i.e. firstly with high thrust and relatively low specific impulse, and secondly with high specific impulse and relatively low thrust.

Thus, an object of the invention is to propose a space vehicle engine capable of providing thrust in both of these operating domains, and of doing so without making the space vehicle excessively heavy or complex.

In order to achieve this object, the invention proposes a space vehicle engine including both a chemical thruster comprising a nozzle for ejecting combustion gas and also a Hall effect thruster, the engine being arranged in such a manner that said nozzle acts as an ejection channel for particles ejected by the Hall effect thruster when it is in operation.

Thus, both technologies, i.e. chemical propulsion and electric propulsion, are incorporated within a single engine. By putting certain means in common, in particular the nozzle, it is possible to make the engine constituted in this way relatively compact. Consequently, the engine as constituted in this way remains relatively simple and inexpensive, given its operating capabilities, which are extended because of the simultaneous presence of both thrusters.

In an embodiment, the Hall effect thruster has a magnetic circuit; and in a section on a meridian half-plane, the magnetic circuit is horseshoe-shaped with an airgap open to the downstream end of the nozzle; in such a manner that the magnetic circuit is suitable for generating a magnetic field in the airgap of the magnetic circuit.

The magnetic field generated in the airgap is preferably substantially radial.

The terms "upstream" and "downstream" are defined in the present context relative to the normal flow direction of propulsion gas in the direction defined by the central axis of the nozzle.

The magnetic field is not necessarily generated throughout the airgap but it is generated in at least a portion thereof, generally situated at its downstream end. A meridian half-plane is a half-plane defined by an axis, specifically the axis of the nozzle.

In this embodiment, it is possible to obtain a magnetic field in the nozzle in particular because, instead of being hollow and empty like most conventional chemical thruster nozzles, this nozzle contains a portion of the magnetic circuit. This inner portion of the magnetic circuit is generally arranged on the axis of the nozzle and is conventionally of an axisymmetric shape or even in the shape of a body of revolution about the axis.

The meridian half-planes in which the section of the magnetic circuit is horseshoe-shaped are preferably angularly distributed regularly around the axis of the nozzle. Ideally, the magnetic circuit presents one such section in every meridian half-plane, i.e. over 360° around the axis of the nozzle.

Preferably, in a meridian half-plane view, the combustion chamber of the chemical thruster is arranged inside the magnetic circuit.

In an embodiment, the nozzle has an axial section of annular shape, and passes through the airgap of the magnetic circuit. The airgap is thus also of annular axial section. The term "axial section" is used herein to mean a section in a plane perpendicular to the axis of the nozzle.

In an embodiment, the magnetic circuit has at least one outer magnetic core situated around the nozzle and an inner magnetic core situated radially inside the nozzle, and in a section on a meridian half-plane, sections of said inner core and of said at least one outer core form branches of said horseshoe-shape.

In an embodiment, the Hall effect thruster further includes an electric circuit suitable for generating an electric field in the nozzle, and the electric circuit includes an anode and a cathode arranged respectively upstream and downstream from the airgap of the magnetic circuit.

The anode and the cathode may be arranged in various ways.

In an embodiment, the anode comprises a portion of the nozzle. For example, it may constitute a portion of the wall of the nozzle.

In another embodiment, the anode is arranged inside the nozzle.

In an embodiment, and in particular in the above embodiment, the anode is electrically insulated from the nozzle.

The anode may be arranged in the vicinity of injectors for injecting fluids (propellant injectors) into the combustion chamber, for the chemical thruster, and/or in the vicinity of particle injectors for the Hall effect thruster: i.e. as a general rule completely at the upstream end of the fluid flow path in the engine.

In an embodiment, axially at the level of the airgap, inner and outer walls of the nozzle are made of electrically insulating material.

These inner and outer walls of the nozzle may in particular be made of ceramic material, which is particularly appropriate because of its electrical, magnetic, and erosion-resistance characteristics. By way of example, the insulating walls may be formed by two electrically insulating rings that define said airgap respectively on its inside and on its outside.

In an embodiment, the nozzle presents a combustion chamber at an upstream end that is connected to a diverging portion at a downstream end.

The Hall effect thruster also includes at least one particle injector. In an embodiment, the particle injector is suitable for injecting particles into said combustion chamber.

The particles may be an inert gas, e.g. xenon.

The present invention also provides a space vehicle incorporating at least one engine as described above.

Figure 2:
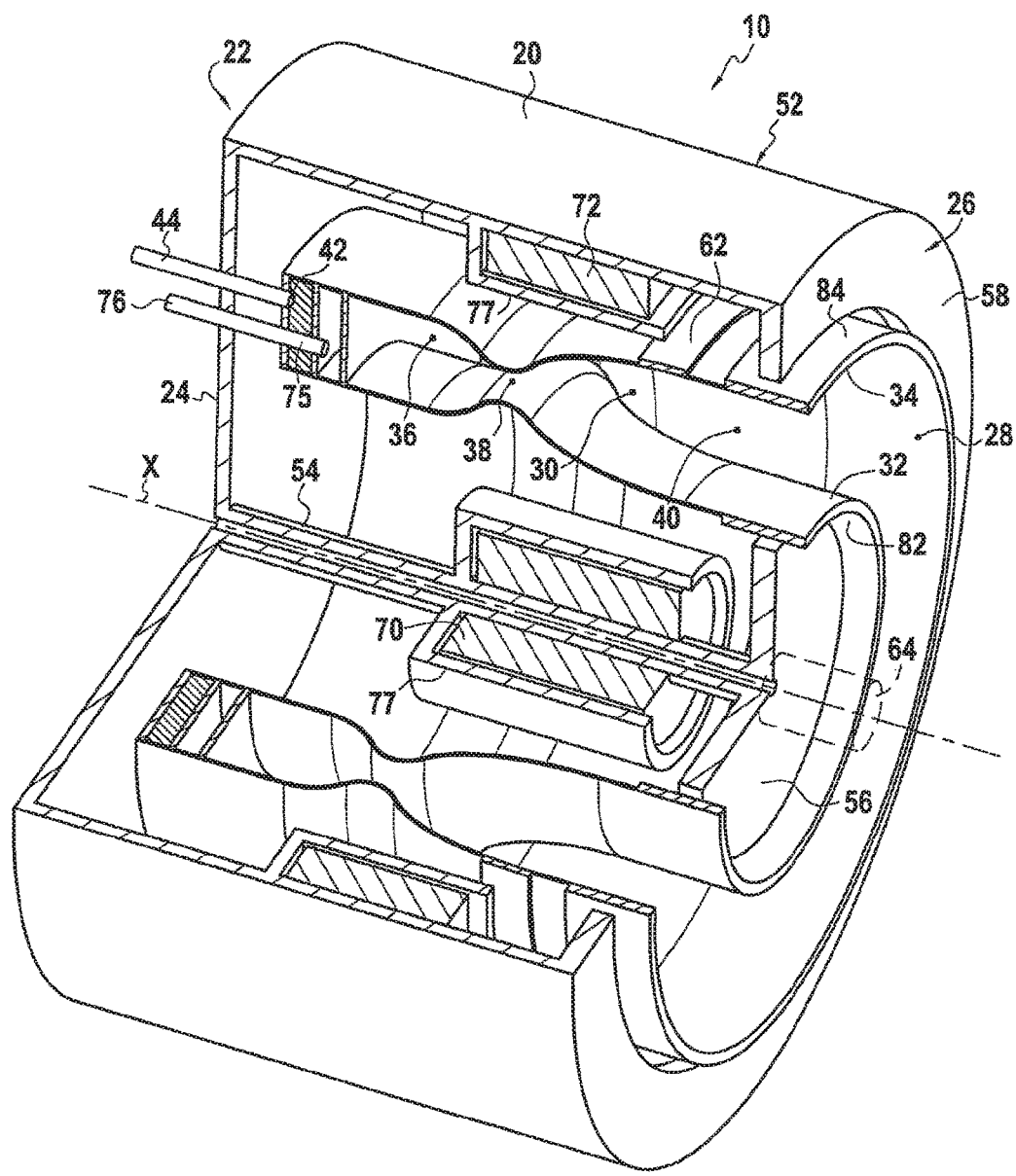

The invention can be well understood and its advantages appear better on reading the following detailed description of two embodiments given as non-limiting examples. The description refers to the accompanying drawings, in which:

FIG. 1 is a fragmentary diagrammatic view in axial section of a space vehicle including a first embodiment of an engine of the invention; and FIG. 2 is a fragmentary diagrammatic perspective view of the engine shown in FIG. 1.

FIGS. 1 and 2 show an engine 10 of the invention. It forms part of a space vehicle 100, in the present case a satellite.

The engine is a hybrid engine that is capable of operating both as a chemical thruster and as a Hall effect thruster. In order to enable it to operate as a chemical thruster or as a Hall effect thruster, the engine 10 is connected to propellant tanks (not shown; there may be a single propellant or two propellants), and it is also connected to a tank of propulsion gas.

The engine 10 is generally in the form of a body of revolution about an axis X.

It is arranged inside a casing 20 that is substantially cylindrical about the axis X. A first axial end 22 of the casing, its upstream end, is closed by a substantially flat end wall 24 perpendicular to the axis X, while the other end 26 (its downstream end) is closed in part by a substantially flat end wall 25 that is likewise perpendicular to the axis X. The end wall 25 has a wide annular passage 28 passing therethrough to eject gas.

The end wall 25 is generally in the form of a disk perpendicular to the axis X. Because of the presence of the annular passage 28, the end wall 25 is constituted by a disk 56 and by an annular ring 58 situated radially around the annular passage 28. The ring 58 is formed integrally with the casing 20.

The engine 10 includes a chemical thruster 11.

The chemical thruster 11 has a nozzle 30 arranged inside the casing 20.

The nozzle 30 is of generally annular shape about the axis X. More generally, the nozzle 30 may also be axisymmetric. Nevertheless, it is possible as an alternative to envisage shapes that are non-axisymmetric, e.g. of cross-section that is oval or racecourse-shaped.

Whether or not the nozzle 30 is in the shape of a body of revolution or axisymmetric, the nozzle 30 is generally annular in shape and thus not only has a radially outer wall 34, but also a radially inner wall 32.

These walls are concentric about the axis X.

The nozzle 30 is closed at the upstream end (on the left in FIG. 1) and open at the downstream end.

From upstream to downstream, the nozzle 30 presents initially a combustion chamber 36, then a throat 38, followed by a diverging portion 40. These elements are arranged so as to enable the engine 10 to operate as a chemical thruster 11.

The chemical thruster 11 also has injectors 42 for injecting propellants. These are arranged in such a manner as to enable propellants to be injected at the upstream end of the combustion chamber 36. For this purpose, they are connected to propellant sources (not shown) by a feed circuit 44.

The engine 10 also has a Hall effect thruster 50. This thruster 50 firstly comprises a magnetic circuit 52.

The magnetic circuit 52 comprises: the casing 20 itself, which is made of ferromagnetic material and thus forms an outer magnetic core; end walls 24 and 25 made of ferromagnetic material; and a central magnetic core 54 in the form of a shaft extending along the axis X. The disk 56 constituting a portion of the end wall 25 forms the downstream end of the shaft 54.

The above-specified elements of the magnetic circuit 52 are arranged together so as to enable a magnetic field to pass without losses via the magnetic circuit.

In order to protect the downstream portion of the nozzle from wear and in order to contain the electron cloud formed in the airgap of the magnetic circuit, the axially downstream portions of the walls 32 and 34 are formed by rings made of ceramic material, given respective references 82 and 84. These rings are positioned at the level of the airgap of the magnetic circuit 52.

The magnetic circuit 52 also has an inner annular coil 70 and an outer annular coil 72 that serve to generate the magnetic field needed to enable the Hall effect thruster to operate. These two coils are formed concentrically around the axis X. The coil 70 is formed around the shaft 54 (radially) inside the wall 32 (i.e. between the shaft 54 and the wall 32). The coil 72 is formed on the inside face of the cylindrical casing 20, and more precisely between the inside face and the outer wall 34 of the nozzle 30.

Axially, the coils 70 and 72 are placed a little way downstream from the throat 38 of the nozzle 30. In more generally manner, these coils may be located axially at any level along the axis X from the combustion chamber at the upstream end to a position immediately upstream from the ceramic rings 82 and 84 at the downstream end.

The coils 70 and 72 are powered by an electric energy source (not shown).

In the magnetic circuit 52, the central magnetic core 54 and the outer magnetic core (the casing 20) are arranged in such a manner as to have opposite polarities.

The circuit 52 is arranged so as to generate a substantially radial magnetic field in the annular passage 28, thus constituting the airgap of the circuit 52.

In other embodiments, the magnetic circuit may be of a structure that is different from that of the circuit 52. The important point is that the magnetic circuit is suitable for generating a radial magnetic field in the ejection passage (specifically the passage 28) of the Hall effect thruster.

The intensity of the magnetic field decreases progressively from the ejection passage 28 to the throat 38 of the nozzle. In the embodiment shown, the magnetic field (which is at its maximum axially level with the passage 28) is attenuated by internal and external magnetic screens 77 so as to reduce the intensity of the magnetic field in the vicinity of the anode 62.

These screens are formed respectively on the inside surface of the casing 20 and on the outside surface of the shaft 54, and they support the coils 70 and 72 mechanically.

The coils 70 and 72 are coils of substantially cylindrical shape, in which each of the turns is substantially in the form of a circle about the axis X. In another embodiment, the coil 72 could be replaced by a plurality of identical coils 72, each about a respective axis parallel to the axis X, the coils 72 being arranged in axisymmetric manner around the outer wall 34 of the nozzle 30.

The downstream portion of the nozzle 30 passes through or extends into the airgap 28 of the circuit 52.

In a section on a meridian half-plane (FIG. 1), the magnetic circuit is thus horseshoe-shaped, with an airgap 28 that is open towards the downstream end 26 of the nozzle 30. Going from the end wall 24, the horseshoe-shape is constituted respectively by the section of the casing 20 on the outside and by the section of the central core 54 on the inside, which form the two branches of the horseshoe.

The thruster 50 also has an electric circuit 60. This circuit comprises an anode 62 situated axially about halfway along the diverging portion 40, a cathode 64 situated downstream from the end 26 of the nozzle 30, and an electric voltage source 66 connecting the anode 62 to the cathode 64.

In more general manner, the anode 62 may be located axially at any level along the axis X going from the combustion chamber at the upstream end to a position immediately upstream from the ceramic rings 82 and 84 at the downstream end.

The anode 62 is constituted mainly by the inner wall 34 of the nozzle 30: it is thus incorporated in the nozzle 30, while being electrically insulated therefrom.

The cathode 64 is fastened on the disk 56 on the outside, i.e. downstream from the shaft 54. In FIG. 2, the cathode 64 is drawn in dashed lines.

The cathode 64 is connected to the electric voltage source 66 by a cable passing inside the inner wall 32 of the nozzle 30.

Advantageously, this cable passes inside the shaft 54.

Finally, at the upstream end of the nozzle 30, the thruster includes propulsion gas injectors 75. These are arranged in such a manner as to enable propulsion gas to be injected into the upstream end of the combustion chamber 36. For this purpose, they are connected to a source of propulsion gas (not shown) by an injection circuit 76. The propulsion gas may be xenon, which presents the advantages of high molecular weight and comparatively low ionization potential. Nevertheless, as in other Hall effect thrusters, a wide variety of propulsion gases could be used.

The engine 10 presents two main modes of operation, namely electric propulsion and chemical propulsion.

For chemical propulsion, the propellants are injected into the combustion chamber 36 via the injectors 42. They are burnt in the chamber; the combustion gas is accelerated by the throat 38 and the diverging portion 40 and ejected at high speed via the downstream opening 28 of the nozzle 30.

For Hall effect propulsion, the engine 10 operates as follows.

An electric voltage, typically of the order of 150 volts (V) to 800 V when xenon is used as the propulsion gas, is established between the cathode 64 downstream from the downstream end of the nozzle 30 and the anode 62. The cathode 64 then begins to emit electrons, most of which are trapped in a magnetic enclosure formed by the magnetic field created by the magnetic circuit 52, which is adapted to the performance desired and to the propulsion gas used, and which is typically of the order of 100 gauss (G) to 300 G when using xenon as the propulsion gas. The electrons trapped in this magnetic enclosure thus form a virtual cathode grid.

Highly energetic electrons (typically 10 electron volts (eV) to 40 eV) escape from the magnetic enclosure towards the anode 62, so long as the propulsion gas continues to be injected into the nozzle 30 via the injectors 75. The impacts between these electrons and the atoms of the propulsion gas ionize the propulsion gas, which is then accelerated towards the downstream end 26 of the nozzle 30 by the electric field E generated by the coils 70 and 72. Since the mass of the propulsion gas ions is several orders of magnitude greater than the mass of electrons, the magnetic field does not confine the ions in the same way as it confines the electrons. The thruster 50 thus generates a plasma jet that is ejected at extremely high speed through the downstream end of the nozzle 30, thereby producing thrust that is substantially in alignment with the central axis X.

The operation of the thruster 50 is analogous to the operation of the thruster described in Document US 2003/0046921 A1.

Optionally, the engine 10 could also include an additional nozzle segment downstream from the rings 82 and 84 for the purpose of enabling additional expansion of the combustion gas when the chemical thruster is in operation.

The annular shaped of the nozzle 30 thus enables it to be used not only as a channel for combustion of propellants and ejection of combustion gas, during chemical propulsion, but also as an ion acceleration channel during electric operation. In particular, the arrangement of the magnetic core 54 in the form of a shaft on the axis of the nozzle does not impede in any way the operation of the chemical thruster 11. Furthermore, the position of the cathode downstream from the end wall 25 and protected by the end of the shaft 54 (the cathode 64 is in direct contact with the center of the disk 56) makes it possible to ensure that the cathode does not come into contact with the stream of combustion gas, to which it cannot be exposed for a long time.

Although the present invention is described with reference to a specific embodiment, it is clear that various modifications and changes could be made to this embodiment without going beyond the general ambit of the invention as defined by the claims. In addition, individual characteristics of the embodiment mentioned may be combined in additional embodiments. Consequently, the description and the drawings should be considered in a sense that is illustrative rather than restrictive.

The invention claimed is:

1. A space vehicle engine comprising;
a chemical thruster having a combustion chamber and a nozzle downstream of the combustion chamber for ejecting combustion gas produced by combustion of at least one propellant when the chemical thruster is in operation;

a Hall effect thruster wherein said nozzle acts as an ejection channel where particles of a propulsion gas are ionized and accelerated by the Hall effect thruster when the Hall effect thruster is in operation, wherein the Hall effect thruster has a magnetic circuit bounding a first annular space and a second annular space, wherein the second annular space is continuous with the first annular space, and wherein the first annular space extends farther radially outward and radially inward than the second annular space, the magnetic circuit at least partially surrounding the nozzle, wherein the magnetic circuit further has an airgap open to a downstream end of the nozzle, wherein the magnetic circuit is configured to generate a magnetic field in the airgap, and wherein the nozzle has an axial section of annular shape, and passes through the airgap.

2. The space vehicle engine according to claim 1, wherein the magnetic circuit has at least one outer magnetic core situated around the nozzle and an inner magnetic core situated radially inside the nozzle, and in a section on a meridian halfplane, wherein sections of said inner magnetic core and of said at least one outer magnetic core surround the second annular space.

3. The space vehicle according to claim 1, wherein the Hall effect thruster further includes an electric circuit configured to generate an electric field in the nozzle, and wherein the electric circuit includes an anode and a cathode arranged respectively upstream and downstream from said airgap.

4. The space vehicle engine according to claim 3, wherein the anode comprises a portion of the nozzle.

5. The space vehicle engine according to claim 3, wherein the anode is arranged in the nozzle and is electrically insulated from the nozzle.

6. The space vehicle engine according to claim 1, wherein, the nozzle has inner and outer walls, and at the airgap's axial position, the inner and outer walls are made of electrically insulating material.

7. The space vehicle engine according to claim 1, wherein the combustion chamber is connected to a diverging portion of the nozzle at a downstream end of the combustion chamber.

8. The space vehicle engine according to claim 7, in which the Hall effect thruster further includes at least one particle injector suitable for injecting particles into said combustion chamber.

9. A space vehicle including at least one space vehicle engine according to claim 1.

10. The space vehicle engine according to claim 1, wherein, the nozzle has inner and outer walls, and at the airgap's axial position, the inner and outer walls are made of ceramic.

11. The space vehicle engine according to claim 1, including:
a feed circuit for feeding the at least one propellant to the chemical thruster; and an injection circuit for feeding propulsion gas to the Hall effect thruster, the feed circuit being distinct from the injection circuit.

12. A space vehicle including at least one space vehicle engine according to claim 11.

* * * * *

UNITED STATES PATENT AND TRADEMARK OFFICE
CERTIFICATE OF CORRECTION

PATENT NO. : 10,023,328 B2
APPLICATION NO. : 15/312421
DATED : July 17, 2018
INVENTOR(S) : Stéphan Joseph Zurbach et al.

Page 1 of 1

It is certified that error appears in the above-identified patent and that said Letters Patent is hereby corrected as shown below:

In the Claims

In Claim 3, Line 26, "The space vehicle according to claim 1, wherein the", should read "The space vehicle engine according to claim 1, wherein the"

Signed and Sealed this
Eleventh Day of September, 2018

Andrei Iancu
*Director of the United States Patent and Trademark Office*